United States Patent [19]

Heyl

[11] Patent Number: 4,830,043

[45] Date of Patent: May 16, 1989

[54] IMPROVEMENT IN ROTARY VALVES

[75] Inventor: Robert D. Heyl, Williamsport, Pa.

[73] Assignee: Delaware Investments, Inc., Wilmington, Del.

[21] Appl. No.: 158,680

[22] Filed: Feb. 22, 1988

[51] Int. Cl.$^4$ .............................................. F16K 43/00
[52] U.S. Cl. ..................................... 137/315; 222/368; 251/214; 251/304; 277/112; 277/124; 403/324; 403/328; 406/68
[58] Field of Search ..................... 137/315; 222/368; 251/214, 297, 304, 309; 277/124; 406/62, 65, 68; 414/219, 220; 403/324, 328, 378

[56] References Cited

U.S. PATENT DOCUMENTS

| | | | |
|---|---|---|---|
| 1,334,154 | 3/1920 | Harrison | 403/328 |
| 3,130,879 | 4/1964 | Messing | 222/368 |
| 3,369,677 | 2/1968 | Mylting | 222/368 |
| 3,430,658 | 3/1969 | Self | 251/297 |
| 4,059,205 | 11/1977 | Heyl | 222/368 |
| 4,600,032 | 7/1986 | Heyl | 222/368 |

Primary Examiner—George L. Walton
Attorney, Agent, or Firm—Lalos & Keegan

[57] ABSTRACT

In a rotary valve assembly including a housing having a valve chamber and a removable cover member defining an end wall of the chamber, a drive shaft journaled in the housing and having an end portion projecting into the valve chamber and a rotary valve disposed in the valve chamber and slidably mounted on the drive shaft end portion whereby the rotary valve may be removed from the housing by removing the cover member and sliding the rotary valve off of the drive shaft end portion and passing it through the opening provided by the removal of the cover member, means for detachably securing the rotary valve on the drive shaft end portion generally consisting of the drive shaft having an opening therein, the rotary valve having an opening therein registrable with the drive shaft opening, a pin inserted in the rotary valve and drive shaft openings when the openings are in registry, and cooperative means disposed on the pin and one of the drive shaft and the rotary valve for yieldably retaining the pin in the openings whereby rotary drive may be transmitted from the drive shaft to the rotary valve.

12 Claims, 2 Drawing Sheets

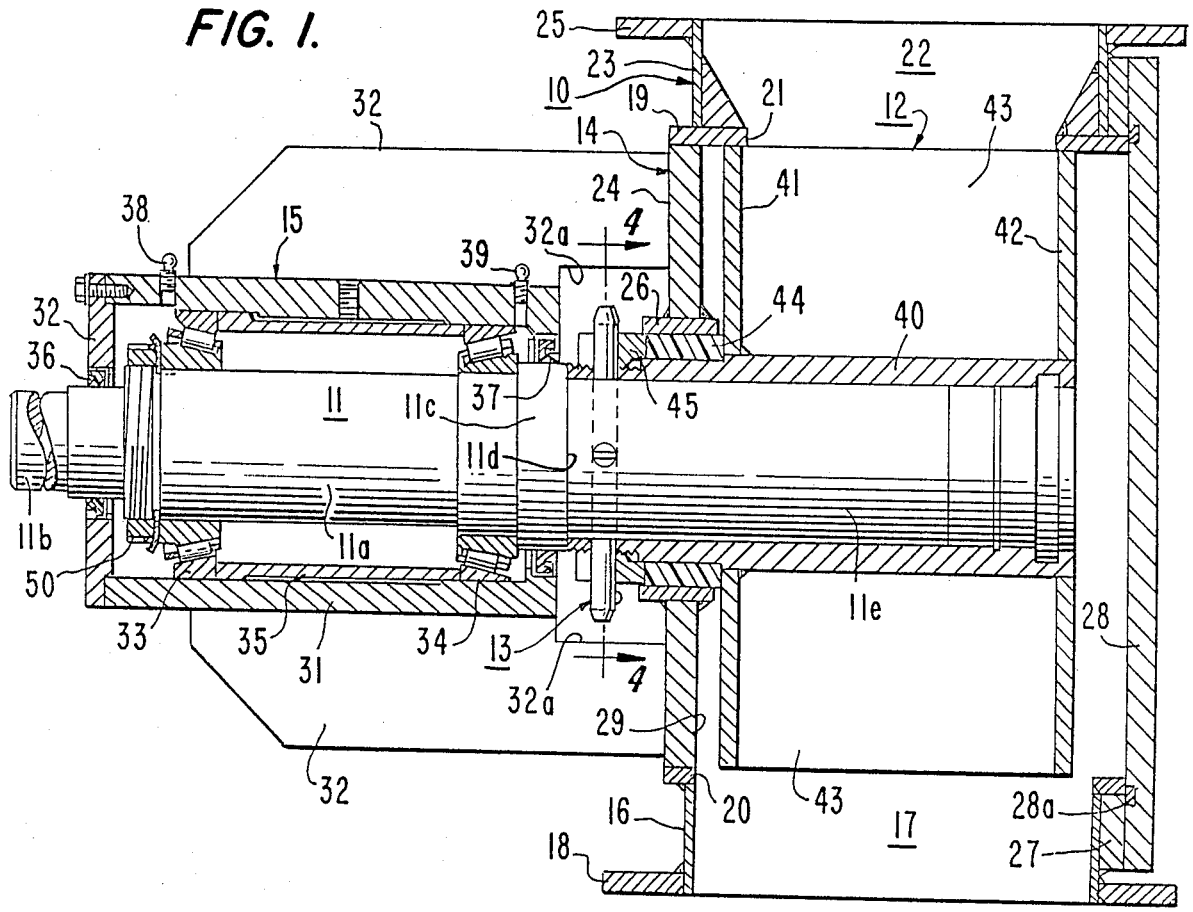
FIG. 1.
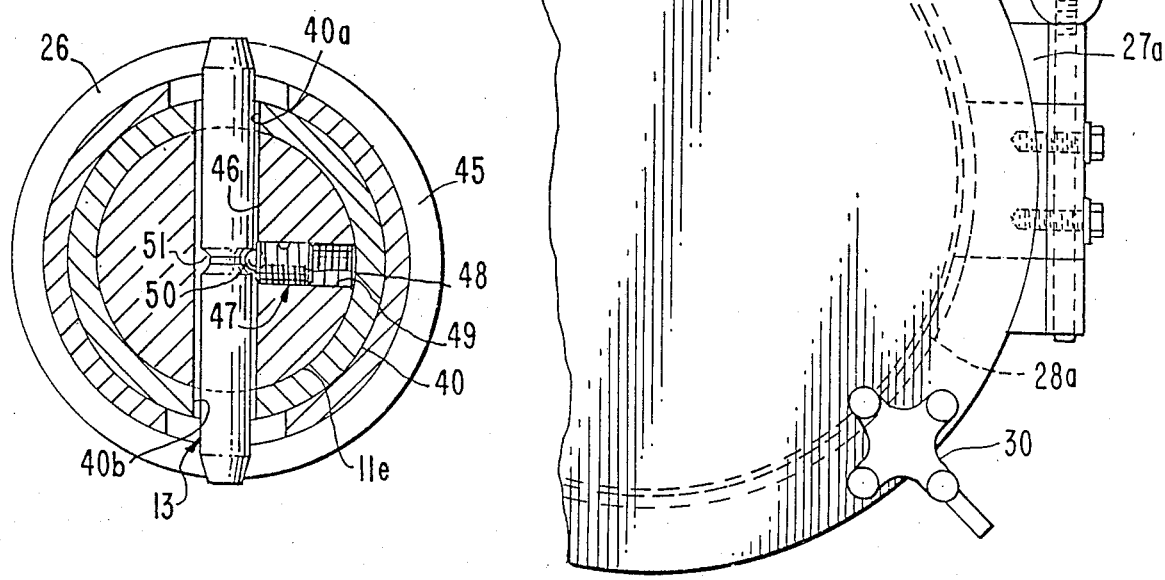
FIG. 4.
FIG. 3.

IMPROVEMENT IN ROTARY VALVES

The present invention relates to a rotary valve assembly and particularly to a rotary valve assembly in which the valve component thereof may be removed readily for cleaning purposes. The invention further contemplates an improved means for securing the valve component on a drive shaft of the assembly to facilitate the removal of the valve component from the drive shaft during dismantling of the valve assembly.

In the prior art, there has been developed a rotary valve assembly which generally consists of a housing having a valve chamber and a removable cover plate defining an end wall of the valve chamber, a drive shaft journaled in the housing of the assembly and having an end portion projecting into the valve chamber, and a rotary valve member slidably mounted on the drive shaft end portion whereby the rotary valve member may be removed from the valve chamber by removing the cover plate on the housing and sliding the rotary valve member off of the drive shaft end portion and passing it through the opening in the housing provided by the removal of the cover plate. Such a valve assembly particularly is adapted for use where sanitary conditions are required such as in the food processing, pharmaceutical and similar industries. The assembly permits the product contacting component, i.e., the valve member, to be periodically readily removed, cleaned and reinstalled to maintain optimum sanitary operating conditions. Such type of valve assembly is more specifically illustrated and described in U.S. Pat. No. 4,059,205, assigned to The Young Industries, Inc. of Muncy, Pa.

In the valve assembly disclosed in the aforementioned patent, drive is transmitted from the drive shaft to the rotary valve member by means of a spline connection which transmits rotary motion yet readily permits the valve member to be removed axially off the drive shaft and out of the housing. More recently, the spline connection in such an assembly has been replaced by a pin connection which consists of a pin removably inserted in a set of registrable openings provided in the drive shaft and a sleeve portion of the valve member mounted on the shaft. The pin functions to transmit drive from the drive shaft to the valve member when the valve assembly is being operated and may be removed to slide the valve member off of the drive shaft and out of the housing. To facilitate the removal of such a connecting pin, there usually is provided a ring or other device disposed on an end of the pin which may be gripped and pulled by the operator. Where a gripping ring is used, a finger may be inserted into the ring to facilitate the gripping and pulling action.

The use of such a gripping device on the end of a connecting pin in the type of valve assembly described, however, presents a possible safety hazard. The valve assembly could be operated inadvertently when an operator is in the process of grasping the ripping device for the purpose of disconnecting the valve member from the drive shaft, thereby possibly causing injury to the operator. It thus has been found to be desirable to provide such a pin connection for the drive shaft and valve member of the type of assembly described which eliminates or at least diminishes the safety hazards attended to such prior art design.

Accordingly, it is the principal object of the present invention to provide an improvement in rotary valves.

Another object of the present invention is to provide an improvement in a rotary valve assembly in which the rotary valve member thereof is adapted to be readily removed for cleaning purposes.

A further object of the present invention is to provide an improved means for mounting a rotary valve member on the drive shaft of a rotary valve assembly which facilitates the removal of the valve member from the drive shaft.

A still further object of the present invention is to provide an improved pin connection between a drive shaft and a valve member of a rotary valve assembly which readily permits the removal of the valve member from the drive shaft.

Another object of the present invention is to provide an improved pin connection between the valve member and drive shaft of a rotary valve assembly which eliminates any possible safety hazards attendant to removing or inserting the pin when the valve member is being removed from or installed in the housing of the assembly.

A further object of the present invention is to provide an improved drive transmitting connection between the drive shaft and a valve member of a rotary valve assembly which is simple in design, comparatively inexpensive to manufacture and effective in performance.

Other objects and advantages of the present invention will become more apparent to those persons having ordinary skill in the art to which the present invention pertains from the following description taken in conjunction with the accompanying drawings wherein:

FIG. 1 is a vertical cross-sectional view of a rotary valve assembly embodying the present invention;

FIG. 3 is an end view of the assembly shown in FIGS. 1 and 2, having a portion thereof broken away; and FIG. 4 is an enlarged cross-sectional view taken along line 4—4 in FIG. 1.

Figure 2:
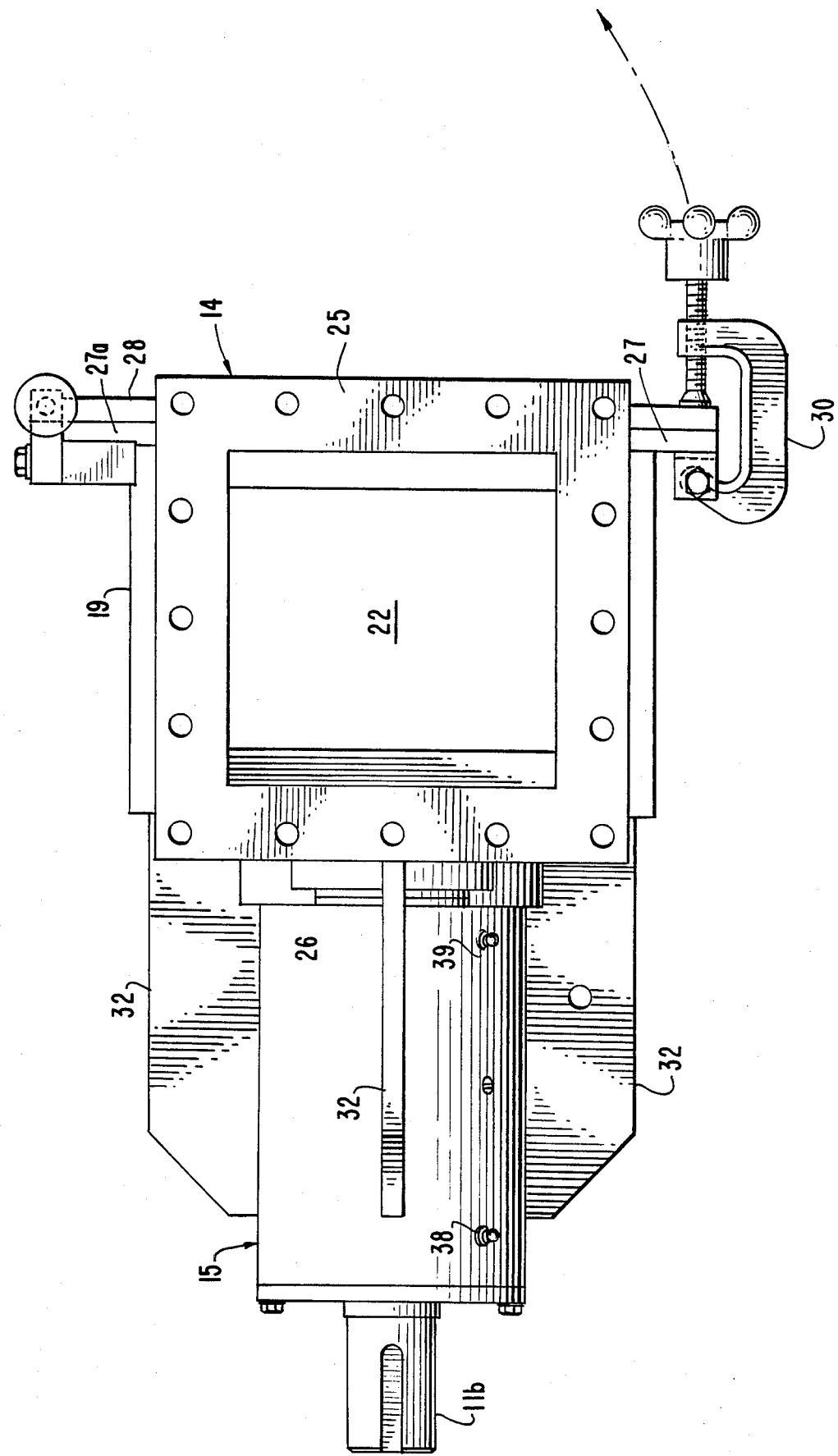
FIG. 2 is a top plan view of the assembly shown in FIG. 1.

The valve assembly illustrated in the drawings generally includes a housing 10, a drive shaft 11 journaled in the housing, a rotary valve 12 mounted on the drive shaft within the housing and a connecting pin 13. The housing includes a valve section 14 and a shaft support section 15. As best shown in FIG. 1, valve housing section 14 includes a base member 16 providing an outlet port 17 and having a peripheral mounting flange 18, a cylindrical wall member 18 having a lower opening 20 communicating with outlet port 17 of the support member, and an upper opening 21 communicating with an inlet port 22 provided by a guide member 23 mounted on the upper end of cylindrical wall member 19, and an end wall 24. Openings 20 and 21 in cylindrical wall 19 are disposed diametrically relative to the axis of cylindrical wall member 19, and guide member 23 is provided with a peripheral mounting flange 25 which is disposed in substantial vertical alignment with lower mounting flange 18 so that the valve housing section may be connected to adjoining conduits of a material conveying system. End wall 24 is provided with an axial opening in which there is provided a cylindrical wall member 26.

Mounted on the outer side of cylindrical wall member 19 adjacent the end opposite from end wall 24 is an annular face plate 27 having a radially projecting bracket portion 27a. Hingedly mounted on bracket 27a is a cover plate 28 which is adapted to engage annular face member 27 and cooperate with end wall 24 and cylindrical wall member 19 to define a valve chamber 29. Cover plate member 28 is provided with an annular seal 28a for sealing the valve chamber when the cover plate member is in the closed position as shown in the drawings. The cover plate member is maintained firmly in the closed position by means of a set of clamped devices 30.

Shaft housing section 15 includes a cylindrical member 31, disposed coaxially with cylindrical wall member 19 and an end wall 32. Housing section 15 is supported on end wall member 24 by means of a set of circumferentially spaced brackets 32. As best seen in FIGS. 1 and 2, the inner end of cylindrical wall member 31 is spaced from end wall 24 and each of support brackets 32 has a cut out portion 32a for accommodating connecting pin 13 as will later be described. Disposed in the shaft support housing section is a pair of tapered roller bearings 33 and 34 which are spaced apart by a cylindrical spacer 35.

Drive shaft 11 is supported in shaft support housing section 15 and extends into valve chamber 29. It includes an intermediate section 11a journaled in bearings 33 and 34, an end section 11b projecting through an opening in end wall 32 and operatively connectable to a motor through a suitable gear reducer, a collar section 11c providing an annular shoulder 11d and an end section 11e projecting into valve chamber 29. The portion of the shaft disposed within housing section 15 is provided with seals 36 and 37 and the bearings within the section are provided with grease through suitable fittings 38 and 39.

Rotary valve member 12 includes a cylindrical shaft section 40 slidably mounted on shaft section 11e, a pair of axially spaced, circular end walls 41 and 42 and a plurality of radially projecting, circumferentially spaced partitioned walls 43. Cylindrical shaft section 40, end walls 41 and 42 and partition walls 43 cooperate to define a plurality of circumferentially spaced pockets which are adapted to communicate with inlet and outlet ports 22 and 17 as the valve member is rotated to meter material through the assembly.

The inner end of the valve chamber is sealed from the exterior by means of a chevron packing 44 disposed between an inner portion of cylindrical shaft 40 and cylindrical wall member 26. The packing is compressed in the conventional manner by means of a packing follower 45 which is threaded on the inner end of cylindrical shaft 40 to engage and compress the packing against end wall 41 of the valve member. As best seen in FIG. 1, the packing follower is recessed to accommodate connecting pin 13.

Referring to FIG. 4, it will be seen that connecting pin 13 is adapted to be inserted in a diametrically disposed opening 46 in shaft section 11e, adjacent annular shoulder 11d, and registered openings 40a and 40b provided on the inner end of cylindrical shaft 40. The connecting pin has a length greater than the diameter of cylindrical shaft 40 and is tapered at its outer ends to facilitate its insertion in opening 46 and registered openings 40a and 40b. The pin is yieldably retained in its inserted, operative position as shown in FIGS. 1 and 4 by means of a detent mechanism 47. The detent mechanism includes a plug 48 adapted to be threaded into a radially disposed threaded opening 49 communicating with diametrically disposed opening 46, and a spring biased ball 50 which cooperates with an annular groove 51 in the connecting pin. It will be appreciated that by simply inserting the connecting pin through registered openings 40a, 46 and 40b and centering the pin therein, ball 50 of the detent mechanism will be urged into recess 51 to yieldedly retain the connecting pin in the inserted, operative position as shown in FIGS. 1 and 4. Whenever it is desired to remove the pin, it merely has to be tapped on an end thereof so that the ball of the detent mechanism will be cammed out of annular groove 51 to release the pin and permit it to be removed manually.

In service, the valve assembly as described may be connected to an overhead supply of a material, such as a material holding bin or blender, by means of mounting flange 25, and may be connected at its lower end to a pneumatic conveying conduit by means of lower mounting flange 18. Shaft 11 is driven by a motor through a suitable gear reducer to rotate valve member 12 and cause material gravity flowing through inlet port 22 and into the pockets of the valve to be carried through the valve chamber and discharged through outlet port 17 into the pneumatic conveying line. The diameters of end walls 41 and 42 of the rotary valve member are substantially equal to the inside diameter of cylindrical wall 19 of the valve housing section, and the spacing of end walls 41 and 42 of the valve member is slightly greater than the longitudinal dimension of inlet port 22 so that any pressure differential across the valve may be maintained to some extent. The material metered by the valve usually is a comminuted material having a poor flow of characteristics. As such material is fed into the pockets of the valve member, carried around and discharged through outlet port 17, some of the material will become lodged in the pockets of the valve and possibly in the inlet and outlet ports and other portions of the valve chamber.

To clean the valve assembly and particularly to remove material lodged in the pockets of the valve member, the motor for the assembly first is deenergized. After the drive shaft comes to rest, it is rotated so that connecting pin 13 is disposed in substantially an upright position as shown in the drawings. The upper end of the pin is then tapped with a hammer or similar tool to cause it to move downwardly and cam ball 50 of the detent mechanism out of the annular groove in the pin. Thus released, the pin will drop out of the drive shaft where it can be recovered and set aside for when the unit is to be reassembled. The valve member then is freed to be slid off of drive shaft end portion 11e and removed from the housing of the assembly. As the valve member is removed, packing 44 and follower 45 will remain on the projecting portion of cylindrical shaft 40 and the packing can either be left on the valve member or replaced depending on its condition. With the valve member thus removed, the valve member and the valve chamber can be cleaned to remove any material lodged thereon or therein.

When it is desired to reassemble the unit, the valve member is inserted into the valve chamber and slid onto drive shaft end portion 11e until the packing is inserted in cylindrical wall member 26 and the inner end of cylindrical shaft 40 engages annular shoulder 11d. The packing follower is then run up on the end of shaft 40 to further engage and compress packing 44. With the recessed portions 45a and 45b of the packing follower aligned with openings 40a and 40b of cylindrical shaft 40, the valve is rotated to register openings 40a and 40b with opening 46 in the drive shaft. Connecting pin 13 is then inserted into the registered openings past ball 50 until the ball is received in annular groove 51 to again yieldably retain the pin in the drive shaft as shown in FIGS. 1 and 2. The cover plate member then can be closed to complete the reassembly of the unit and the assembly is then in condition to be placed back in service.

With the connecting pin arrangement as described, there is no requirement for the operator to engage any device on the end of the pin with his fingers to either remove or install it thus eliminating the prospects of having his fingers becoming entangled with the connecting pin. When the pin is being removed, it simply requires a slight tap on the end of it with a hammer or similar tool without the operators hand being anywhere near the pin. When the pin is again installed, it merely involves aligning and dropping the pin in the registered openings and tapping the end of the pin with a hammer or similar tool to force it past the ball of the detent mechanism and allow it to extend further into the drive shaft until the ball of the detent mechanism in inserted in the annular groove of the pin.

Although the invention has been described in terms of the detent mechanism being disposed on the drive shaft and the cooperating groove being formed in the connecting pin, it is to be understood that such cooperating elements may be reversed with the detent disposed in the pin and the groove formed in the drive shaft or even the cylindrical shaft of the valve member. In addition, the detent mechanism may be provided on the valve member which would cooperate with a groove formed on the pin.

When the valve member is removed as described, the drive shaft also may be readily removed to replace the bearings or seals thereof. This may be accomplished merely by removing end plate 32, backing off a bearing lock nut 50 and sliding the drive shaft with the bearing assembly out through the opening provided by the removal of end wall 32. The bearings and seals may then be replaced and the drive shaft reinserted into the housing of the assembly to the position a shown in the drawings.

The assembly as described can be fabricated of any suitable materials although where sanitary conditions are required, it is preferred that at least the rotary valve be constructed of stainless steel. Other materials, of course, can be used, again, depending on the intended application of the assembly.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. In a rotary valve assembly including a housing having a valve chamber and a removable cover member defining an end wall of said chamber, a drive shaft journaled in said housing and having an end portion thereof extending into said valve chamber and a rotary valve disposed in said valve chamber and slidably mounted on said drive shaft end portion packing means disposed between said rotary valve and said housing, and a packing follower threadedly mounted on said rotary valve, safety means for detachably securing said rotary valve on said drive shaft end portion comprising;

said drive shaft having an opening therein, said rotary valve having an opening therein registrable with said drive shaft opening, a pin inserted in said rotary valve and drive shaft openings when said openings are in registry, and cooperative means disposed on said pin and one of said drive shaft and said rotary valve and exerting a biasing force radially relative to the axis of said drive shaft for yieldably retaining said pin in said registered openings whereby rotary drive may be transmitted from said drive shaft to said rotary valve, whereby said rotary valve and said packing means may be removed from said valve chamber as a single unit by tapping and removing said pin, removing only said cover member and sliding said rotary valve off of said drive shaft end portion and passing it through the opening provided by the removal of said cover member so as to clean, maintain and/or repair said single unit and thereby preventing a valve operator from having to come into contact with said pin upon removal thereof.

2. A detachable securing means according to claim 1 wherein said yieldable retaining means are operable to yield upon application of a longitudinally directed force on said pin.

3. A detachable securing means according to claim 1 wherein said yieldable retaining means comprises a detent mechanism.

4. A detachable securing means according to claim 3 wherein said detent mechanism includes a spring biased ball mounted on said drive shaft and cooperable with an annular recess formed in said pin.

5. A detachable securing means according to claim 1 wherein said drive shaft includes means engagable by said rotary valve for axially aligning said drive shaft and rotary valve opening.

6. A detachable securing means according to claim 1 wherein said drive shaft opening is disposed diametrically relative to the axis of said drive shaft and said rotary valve openings comprise a pair of diametrically aligned openings disposed in a cylindrical portion of said rotary valve slidably mounted on said drive shaft.

7. A detachable securing means according to claim 6 wherein said yieldable retaining means are operable to yield upon application of a longitudinally directed force on said pin.

8. A detachable securing means according to claim 6 wherein said yieldable retaining means comprises a detent mechanism.

9. A detachable securing means according to claim 8 wherein said detent mechanism includes a spring biased ball mounted on said drive shaft and cooperable with an annular recess formed in said pin.

10. A detachable securing means according to claim 6 wherein said drive shaft includes a radially disposed surface engagable by said rotary valve cylindrical portion for axially aligning said drive shaft and said rotary valve openings.

11. A detachable securing means according to claim 1 wherein said pin is provided with beveled end portions for facilitating the insertion thereof into said rotary valve and drive shaft openings.

12. A rotary valve assembly according to claim 1 wherein, said packing follower includes a first surface engageable with said packing means for compressing said packing means when said packing follower is threaded on said rotary valve and a surface having at least one recess registrable with said opening in said rotary valve for receiving said pin therethrough.

* * * * *